United States Patent [19]

Yonescu et al.

[11] Patent Number: 4,991,968
[45] Date of Patent: Feb. 12, 1991

[54] THREE DIMENSIONAL OBJECT SURFACE DETERMINATION WITH AUTOMATIC SENSOR CONTROL

[75] Inventors: William E. Yonescu, Dix Hills; Howard K. Stern, Greenlawn, both of N.Y.

[73] Assignee: Robotic Vision Systems, Inc., Hauppauge, N.Y.

[21] Appl. No.: 221,641

[22] Filed: Jul. 20, 1988

[51] Int. Cl.⁵ .............................................. G01B 11/24
[52] U.S. Cl. .................................... 356/376; 356/375; 250/205
[58] Field of Search ........................... 356/376, 375, 1; 250/205

[56] References Cited

U.S. PATENT DOCUMENTS

| | | | |
|---|---|---|---|
| 4,493,533 | 1/1985 | Korb et al. | 356/43 |
| 4,634,879 | 1/1987 | Penney | 356/376 |
| 4,705,395 | 11/1987 | Hagenlers | 356/375 |

Primary Examiner—F. L. Evans
Assistant Examiner—K. P. Hantis
Attorney, Agent, or Firm—Robin, Blecker, Daley & Driscoll

[57] ABSTRACT

A system for object surface determination in which the projector/detector sensor of the system is controlled by a control detector which is responsive to a plurality of different parts of a portion of the reflected radiation being sensed by the projector/detector sensor.

44 Claims, 2 Drawing Sheets

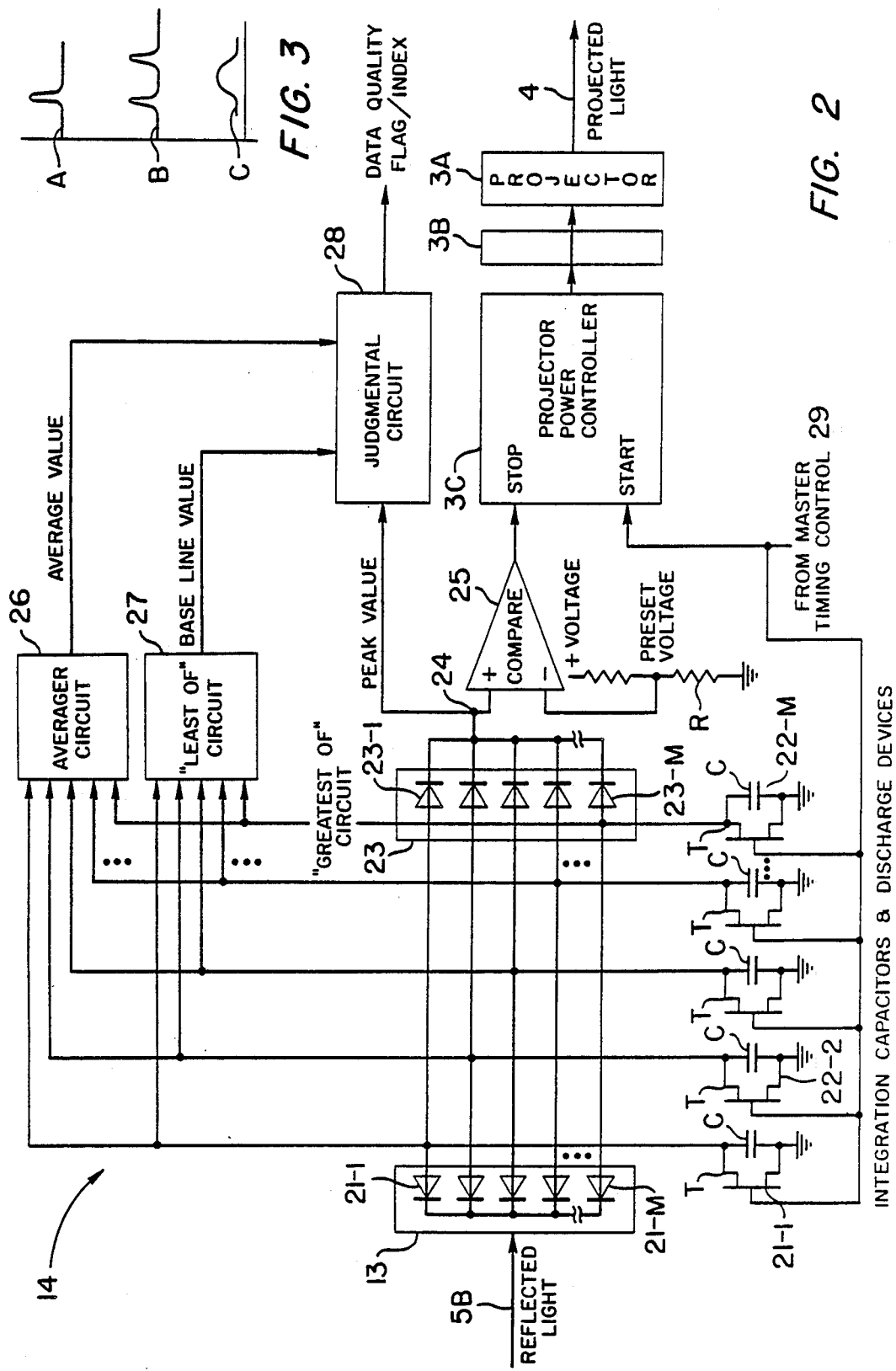

THREE DIMENSIONAL OBJECT SURFACE DETERMINATION WITH AUTOMATIC SENSOR CONTROL

BACKGROUND OF THE INVENTION

This invention relates to a method and apparatus for object surface determination and, in particular, a method and apparatus for object surface determination which utilizes projected electromagnetic radiation.

In systems in use today for determining the positions of points on an object surface, a projector/detector sensor is used to develop data which is then analyzed and processed to obtain the surface point locations. In a typical system, the sensor comprises a projector which projects electromagnetic radation such as, for example, optical radiation, at the object surface. The projected electromagnetic radiation confronts or intersects the surface and gives rise to reflected radiation. The reflected radiation is then collected by a lens which focuses the reflected radiation onto a radiation detector, the lens and detector forming parts of the sensor. An analyzing and processing unit is fed the output of the sensor, i.e., the sensor detector output, and using conventional triangulation techniques determines the locations of the points on the object surface.

In order for the aforesaid system to provide accurate surface point determinations, the power of the reflected radiation collected by the lens and coupled to the radiation detector must fall well within the useable dynamic range of the sensor detector. By useable dynamic range is meant the range between the power level at which the detector is saturated (i.e., provides no increase in output for an increase in input power or when deleterious effects are introduced) and the power level corresponding to a level significantly above the noise of the system. Where the object surfaces being analyzed may have diverse reflective characteristics from surface to surface such as, for example, those found in solder joints, it is not always possible to achieve the aforementioned condition. Thus, with these types of surfaces, the dynamic range of the reflected radiation intensity and, therefore, reflected power, for a constant on time of the projector, may be 1000:1, while the useable dynamic range of the radiation sensor detector may be only about 6:1. As a result of this, the system performance suffers and in many cases is unsatisfactory.

One way of attempting to avoid this problem is to project radiation at a number of different power levels at the surface and obtain data from the sensor detector for each projection. The data from the different projections which is considered most acceptable is then selected for further processing. This procedure, however, is time consuming and increases the overall time for surface examination by N times, where N is the number of projections required to obtain acceptable data for worst case conditions. A typical range for N would be from 6 to 15, thereby significantly increasing the overall time of operation.

It is therefore an object of the present invention to provide a system of the above type wherein the dynamic range of the reflected radiation intensity of the system is not limited to the dynamic range of the sensor detector of the system.

It is a further object of the present invention to provide a system of the above type wherein a relatively large diversity of reflective characteristics of object surfaces can be accommodated, while not significantly increasing the operating time of the system.

SUMMARY OF THE INVENTION

In accordance with the principles of the present invention, the above and other objectives are realized in a system of the above type by further providing therein a control means for the sensor of the system. The control means includes a detector which is arranged to be responsive to a portion of the reflected electromagnetic radiation and which, when the power or energy in any one of a plurality of parts of the radiation, exceeds a predetermined level, causes the portion of the reflected radiation being coupled to the sensor detector be inhibited or stopped. By suitable selection of the predetermined level, the radiation is terminated in such time that the power or energy of the radiation portion coupled to the sensor detector is within the detector's dynamic range for the expected range of intensities of the reflected radiation.

In further accord with the invention, the aforesaid is further facilitated by the sensor projecting the radiation such that it is non-uniform with time and, in particular, such that it increases with time. In this way, the inherent time delay in terminating the reflected radiation for a highly reflective surface is compensated for. Also, the time required for the reflected radiation to build up for surfaces of limited reflectivity is reduced.

In the embodiments of the invention to be disclosed hereinafter, the sensor detector and the sensor control detector each include multiple, independent detector elements. The detector elements of the sensor control detector, in turn, define the different parts of the portion of the reflected radiation received by the detector and develop signals for comparing the energy or power in these different radiation parts with the predetermined level.

DESCRIPTION OF THE DRAWINGS

The above and other features and aspects of the present invention will become more apparent upon reading the following detailed description in conjunction with the accompanying drawings, in which:

FIG. 2 shows in greater detail a block diagram for the sensor control section of the system of FIG. 1.

DETAILED DESCRIPTION

Figure 1:
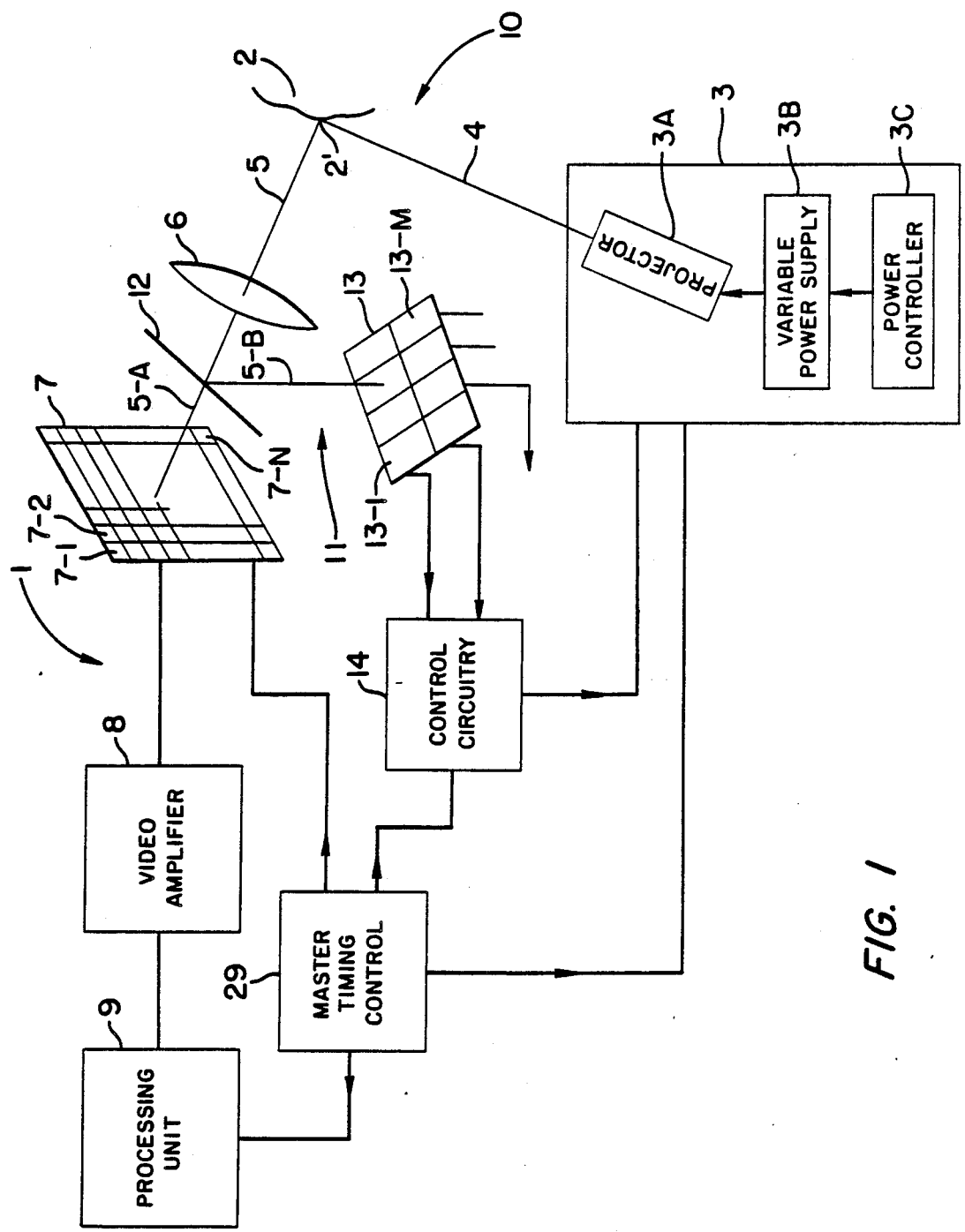
FIG. 1 shows a system for three-dimensional determination of the points on the surface of an object in accordance with the principles of the present invention.

In FIG. 1, a system 1 for determining the positions or locations of the points on the surface of an object 2 is illustrated. The system 1 comprises a projector assembly 3 including a projector 3A for projecting electromagnetic radiation 4 at the object 2, a variable power supply 3B for supplying power to the projector and a projector power controller 3C for controlling the variable power supply. In the present illustrative case, the electromagnetic radiation 4 is assumed to be a pencil beam of optical radiation or light and the projector 3A is assumed to be a laser beam source.

While the projector 3 is thus illustrated as a laser source whose power supply is varied by a controller 3C, the principles of the invention may be also accomplished by use of a modulated continuous wave laser. Thus, for example, a HeNe laser could be gated on and off via an acousto-optic or Kerr cell or Pockels cell (with cross polarizers) modulator. These devices can provide amplitude modulation with on/off control equivalent to that of a laser source with variable power supply.

The projected beam of radiation or light 4 is incident on the object 2 and at the point of incidence 2' a spot on the surface is illuminated. The light creating the spot is then reflected from the surface and the reflected light 5 in the field of view of a lens 6 is collected by the lens. The lens then directs or focuses the collected light 5 onto a sensor detector 7.

The sensor detector 7 comprises a plurality of independent, detector segments or elements 7-1, 7-2 . . . 7-N, each of which develops an electrical signal proportional to the power-time integral, i.e., the energy, in the part of the reflected light incident thereon. Since the resolution of the system 1 is dependent upon the number of elements in the sensor detector 7, it is desirable that the number of elements be relatively large. Available detectors meeting the requirement of a large number of elements, however, typically develop a voltage output across each element proportional to the energy or power-time integral of the incident light and typically these voltages can be read out from the elements only serially, i.e., one voltage following the other in time. Detector 7 is assumed to be such a serial type detector. A particular detector useable as the detector 7 might be the 256 element video pickup or chip sold by EG & G Reticon under component part number RL0256CEQ-011.

The projector assembly 3, lens 6 and sensor detector 7 thus together form a sensor 10 which develops electrical signals (the detector 7 signals) from which the positions of the points on the surface of the object 2 can be determined. In particular, by analyzing the signals from the elements of the detector 7, an indication of the location of each illuminated point, e.g., the point 2', on the object surface can be obtained. This is accomplished in the system 1 by serially reading out the voltage signals from the sensor elements 7-1 to 7-N and then passing the read out signals through a video amplifier 8. The amplified signals, in turn, are fed to a processing unit 9. The latter unit, using standard triangulation practices, then analyzes and processes the signals to provide the three dimensional location of the object surface points.

In order for the system 1 to make an accurate determination of the object surface points, the power in the reflected light 5 incident on the detector elements 7-1 to 7-N must be above the power level attributable to noise and below the power level (or more precisely the power-time integral) which saturates or causes blooming (false spreading of the detected signal) at the detector elements, i.e., the power level must be within the dynamic range of the detector. In situations where the object surface is a highly reflective surface such as, for example, a solder joint on a printed circuit board, the range of intensities of the reflected light 5 for different object surfaces can be quite broad and may be of the order of 1000:1.

Where the light projected from the projector 3A is at a constant intensity over a constant time or projection period, the range of 1000:1 in the expected intensities of the reflected light 5 translates into a like 1000:1 dynamic range in power which must be accommodated by the detector elements 7, if the system 1 is to be able to detect the points on the various reflective surface. Present day detectors usable for detector 7 (e.g., component RL0256CEQ-011 of EG & G Reticon mentioned above), however, typically may have a nominal dynamic range of 100:1 and, in practice, a useable dynamic range of only about 6:1. Thus, conventional detectors alone are not able to satisfy the needed requirements for detection of the various object surfaces.

In accordance with the principles of the present invention, this ability is provided in the system 1, by further adapting the system to control the projector assembly 3 such that the energy of the reflected light 5 at the detector 7, over the expected dynamic range of intensities of the reflected light, is kept within the dynamic range of the sensor detector 7. This is accomplished in accord with the invention, by providing a sensor control assembly 11 which monitors the energy in parts of the reflected light 5 and inhibits the reflected light 5 from reaching the detector 7 after the energy in any one of the monitored parts exceeds a predetermined level.

More particularly, the sensor assembly 11 comprises an optical beam splitter 12 which is placed in the path of the reflected light 5, between the lens 6 and the detector 7, a sensor control detector 13 and control circuitry 14. Specifically, the transmission/reflective properties of the beam splitter 12 are such that the beam splitter passes a major portion 5A of the reflected light 5 to the detector 7 undisturbed, while it reflects the smaller remaining portion 5B of the light 5 and redirects it to the sensor control detector 13. The detector 13 is positioned relative to the beam splitter 12 so that the reflected light portion 5B is focused onto the detector 13 similarly to the light portion 5A being focused onto the detector 7.

Furthermore, in accord with the invention, the detector 13 also comprises a plurality of independent, detector elements 13-1 to 13-M. In this case, however, the elements are such that the signals from the elements can be read in parallel, i.e., simultaneously with each other in real time. As a result, with the detector 13, the desired real time monitoring of the energy in various parts of the reflected light 5B (i.e., those parts incident on elements 13-1 to 13-M) can be realized. These values of energy, in turn, are indicative of the relative energy in the various parts of the reflected light 5A incident on the sensor detector 7. Accordingly, by inhibiting or retarding passage of the reflected light 5 when the monitored energy values developed from the detector 13 exceed a predetermined level, the energy in the parts of light 5A delivered to the sensor detector elements 7-1 to 7-N can be confined to the dynamic range of the sensor detector 7 over a wide range of surface reflectivities of object 2.

Preferably, the predetermined level is adjusted such that the light 5A delivered to the elements 7-1 to 7-N result in a maximum energy in any element which is at about the middle of the dynamic range of the detector 7. As can be appreciated, the closer the number of elements M of the sensor control detector 13 is to the number of elements N in the sensor detector 7, the more accurately the aforesaid control effected by the sensor detector 13 will be. However, the selection of the detector 13 depends, amongst other things, on the availability of detectors whose elements can be read in parallel. Typically, as above-indicated, detectors having large numbers of elements, such as those mentioned above for the detector 7, can only be read serially and, thus are not suitable. The non-suitability stems from the fact that the light must be inhibited immediately upon reaching the desired level which can be accomplished with real time parallel readout detectors, but not with serial readout detectors that are essentially non-real for this application. However, detectors having at least 8 elements and providing output currents proportional to the incident light intensity and readable in parallel are presently available and can be used as the detector 13 with accurate results. A typical detector of this type is sold under component No. PDA-20 by EG & G Photon Devices.

FIG. 2 illustrates the control circuitry 14 of the sensor control assembly 11. This circuitry develops the required power signals from the current signals of the detector elements 13-1 to 13-M and terminates the reflected light 5 to the sensor detector 7. In this case, the latter is accomplished by addressing the projector controller 3C which causes the power supply 3B to terminate the power to projector 3A, thereby ceasing the projection of the light 4 and, therefore, the reflected light 5.

More particularly, the output current signals from the detector elements 13-1 to 13-M (shown as diodes 21-1 - 21-M) are first each integrated in respective integration circuits 22-1 to 22-M each comprised of a capacitor C and a field-effect transistor T. The resultant integrated signals, which now correspond to the energy in the incident light, are then coupled to a "greatest of" circuit 23 comprised of diodes 23-1 to 23-M. The circuit 23 forms at node 24 a value equal to the greatest value of integrated current which corresponds to the greatest energy value. This greatest value is then fed to the positive input (+) of a comparator 25 and is compared to the above-mentioned predetermined value which is applied to the negative input (−) of the comparator. The predetermined value is shown as a present voltage developed across a resistor R.

When the greatest energy value exceeds the predetermined value, a signal is generated at the comparator 25 output and the generated signal addresses the stop input of the projector power controller 3C. The power controller 3C thereupon causes the projector supply 3B to cease providing power to the projector 3A and light projection ceases. Projected light 4 thereupon ceases causing reflected light 5 (i.e., reflected light portions 5A and 5B) to also cease. The light power delivered to sensor detector 7 is thereby stopped and thus controlled to keep within the dynamic range of the sensor detector 7 as above-described.

In order to remove the energy values developed by the capacitors C of the circuits 22-1 to 22-M, the transistors T of the circuits are turned off by the master timing control 29 of the system 1 at the start of each projection period and turned on in advance of the next projection period. This insures synchronism between the sensor control assembly 11 and the sensor 10.

While the sensor control assembly 11 thus enables the sensor 10 to be operated within the dynamic range of the sensor detector 7, the system 1 is further adapted to compensate for inherent limitations in equipment which tend to reduce the reflected intensity range sensitivity of the system and which tend to increase the operating time of the system. Thus, for example, since turning off of the projector 3A inherently requires a certain amount of time, this time lag itself limits the upper end of the range of intensities of the reflected light whose resultant energy can be brought within the dynamic range of the sensor detector 7. On the other hand, where the intensity of reflected light is low, in order to bring it within the dynamic range of the sensor detector 7, the projector 1 has to be kept on for a significant amount of time. This increases the operating time of the system and, if too long, is undesirable.

Both these conditions are alleviated, in accord with a further aspect of the invention, by adapting the system 1 such that the intensity of the projected light 4 is not constant, but varies with time over the projection period. More particularly, the intensity is increased with time over the period, starting with a low value and then increasing to a high value.

In this way, the low initial value of intensity compensates for the time lag in turning off the projector 3A. This is accomplished since it takes longer to saturate detector 7 at a lower power level. As a result, light reflected from highly reflective surfaces can now be more readily brought into the desired portion of the dynamic range of the sensor detector 7 by the control assembly 11. On the other hand, where the surface is not highly reflective, the increase in intensity with time significantly reduces the time needed to bring the power-time integral up into the sensor dynamic range.

The particular manner in which the intensity of the projected light is increased, i.e., linearly, non-linearly, etc., will depend upon the system 1 parameters and operating conditions. The characteristic, once chosen, however, can be effected by the controller 3C controlling delivery of power from the variable power supply 3B to meet the characteristic. As an alternative to varying of the intensity of the projected light 4, a pulsed laser with a controlled varying firing rate (slow to fast) can be used. In both cases, the overall resultant effect is the same, i.e., the power of the projected light is increased with time.

As an example of the effect of using projected light which increases with time, if the light increases linearly, a dynamic range of approximately 10,000 to 1 in reflective power can be realized using a minimum on time for the projector of 200 ns, which is a likely lower value based on equipment constraints, and a maximum on time of 20 us, which is an acceptable value. If, on the other hand, the projected light were maintained constant, to be able to achieve the same minimum on time of 200 ns and the same dynamic range, the maximum on time would have to be unacceptably high at 2000 us. Even if in the later case, the dynamic range requirement were reduced to 1000, the maximum on time would have to be 200 us, which still is intolerably high. Thus, the advantage of increasing the intensity of the projected light in accordance with the invention as a means of achieving a high dynamic range and acceptable minimum and maximum on times is apparent.

In FIG. 2, the sensor control circuitry is also provided with added circuitry for developing signals indicative of the character of the reflected light 5A being sensed by the sensor detector 7. These signals can then be used to control the projection of the light 4 by the projector 3A and/or merely to give an indication of the character of the data being developed.

An averaging circuit 26 and a "least of" circuit 27 monitor the integrated signals or energy values from the control elements 13-1 to 13-M. The circuit 26 determines the average of the energy values, while the circuit 27 determines the lowest energy value, i.e., the so-called "base-line" energy. A judgement circuit 28 is responsive to these values and to the highest or peak energy value from the node 24 and makes a judgement as to the quality of the data. The judgement circuit output is then coupled to the controller 3C to modify the on-time of the projector 3A, accordingly. The judgement output also serves as a flag/indicator signal indicative of the quality of the data. Thus, the signal might indicate that data is good or bad, or some index proportional therebetween.

The waveforms in FIG. 2 show three examples of possible composite signals which might be developed by the sensor detector 7. Waveform C shows "poor" quality data due to high baseline level vs. peak level. Waveform B shows "poor" quality data due to high average value compared to peak value even though the baseline value is low. This high average value could be due to multiple returns as depicted in the waveform. Finally, waveform A shows "good" quality data, since it is has a high value, low baseline and low average.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for developing data for use in determining the three dimensional position of the points on the surface of an object comprising:
   sensor means including: means for projecting electromagnetic radiation at the surface of the object; means for collecting electromagnetic radiation reflected from the object surface; and first detector means for receiving a first portion of the collected electromagnetic radiation; and
   control means comprising: second detector means for receiving a second portion of the collected electromagnetic radiation, said second detector means developing a plurality of second signals each indicative of the energy in a different one of a plurality of different parts of said second portion of electromagnetic energy; and means for inhibiting electromagnetic radiation from being received by said first detector means when any one of said second signals exceeds a predetermined level.

2. Apparatus in accordance with claim 1 wherein: said projecting means increases the energy of said projected electromagnetic radiation with time.

3. Apparatus in accordance with claim 2 wherein: said electromagnetic radiation is optical radiation.

4. Apparatus in accordance with claim 1 wherein: said electromagnetic radiation is optical radiation.

5. Apparatus in accordance with claim 4 wherein: said optical radiation is in the form of a pencil beam.

6. Apparatus in accordance with claim 1 wherein: said inhibiting means inhibits electromagnetic radiation from being received by said first detector means by controlling said projecting means of said sensor means.

7. Apparatus in accordance with claim 6 wherein: said inhibiting means controls said projecting means so that said projecting means stops projecting said electromagnetic radiation when any one of said second signals exceeds said predetermined level.

8. Apparatus in accordance with claim 7 wherein: said projecting means includes: a projector for projecting said electromagnetic radiation; a power supply for supplying power to said projector; and power control means for controlling the said power supply;
   and said inhibiting means causes said power control means to cause said power supply to shut off the power to said projector when any one of said second signals exceeds said predetermined level.

9. Apparatus in accordance with claim 1 wherein: said first detector means develops first signals indicative of a plurality of different parts of said first portion of electromagnetic energy.

10. Apparatus in accordance with claim 9 wherein: said first and second signals are each indicative of the energy in their corresponding parts of the respective first and second portions of electromagnetic radiation.

11. Apparatus in accordance with claim 10 wherein: said first detector means comprises:
    a first detector having a plurality of elements each for developing independently of the other a signal indicative of the energy in a different one of the plurality of different parts of said first portion of electromagnetic radiation;
    and said second detector means comprises: a second detector having a plurality of elements each for developing independently of the other a signal indicative of the intensity of a different one of said different parts of said second portion of electromagnetic radiation; means for integrating each of said intensity signals to develop said second signals; and means for comparing the greatest of said second signals with said predetermined level.

12. Apparatus in accordance with claim 11 wherein: said signals from said first detector elements are voltages signals;
    and said signals from said second detector elements are current signals.

13. Apparatus in accordance with claim 11 wherein: said collecting means comprises lens means for directing said reflected electromagnetic radiation to said first detector;
    and said control means further comprises electromagnetic radiation splitter means following said lens means for splitting said electromagnetic radiation into said first and second portions of electromagnetic radiation and allowing said first portion of electromagnetic radiation to pass to said first detector and directing said second portion of said electromagnetic radiation to said second detector.

14. Apparatus in accordance with claim 13 wherein: said lens means focuses said electromagnetic radiation such that said first and second portions of electromagnetic radiation are focused on said first and second detectors, respectively.

15. Apparatus in accordance with claim 11 wherein: the number of elements in said first detector is greater than the number of elements in said second detector.

16. Apparatus in accordance with claim 15 wherein: the number of elements in said second detector is 8 and the number of elements in said first detector is 256.

17. Apparatus in accordance with claim 1 further comprising:
    means for determining the average value of said second signals.

18. Apparatus in accordance with claim 17 further comprising:
    means for determining the smallest of said second signals.

19. Apparatus in accordance with claim 18 wherein: said sensor means is responsive to said means for determining the average and smallest values of said second signals.

20. Apparatus for developing data for use in determining the three dimensional position of the points on the surface of an object comprising:
  means for projecting electromagnetic radiation over a given period of time at a point on the surface of an object;
  means for collecting the electromagnetic radiation reflected from the object surface point and for sensing the collected electromagnetic radiation;
  and means for controlling said projecting means to cause the energy of said projected electromagnetic radiation to be of a lower energy at the beginning of said period of time and to increase to a higher energy at the end of said period of time.

21. Apparatus in accordance with claim 20 wherein: said projecting means includes a continuous wave laser.

22. Apparatus in accordance with claim 21 wherein: said controlling means includes an acousto-optic modulator.

23. Apparatus in accordance with claim 21 wherein: said controlling means includes a Kerr cell.

24. Apparatus in accordance with claim 21 wherein: said controlling means includes a Pockels cell.

25. Apparatus in accordance with claim 20 wherein: said projecting means includes a controlled rate pulse laser;
  and said controlling means varies said pulse rate from slow to fast.

26. A method for use in developing data for determining the three dimensional position of the points on the surface of an object comprising:
  projecting electromagnetic radiation at the surface of the object;
  collecting electromagnetic radiation reflected from the object surface;
  detecting a first portion of the collected electromagnetic radiation;
  detecting a second portion of the collected electromagnetic radiation and developing a plurality of second signals each indicative of the energy in a different one of a plurality of different parts of said detected second portion of electromagnetic energy;
  and inhibiting detection of said first portion of electromagnetic radiation when any one of said second signals exceeds a predetermined level.

27. A method in accordance with claim 26 wherein: the energy of said projected electromagnetic radiation increases with time.

28. A method in accordance with claim 27 wherein: said electromagnetic radiation is optical radiation.

29. A method in accordance with claim 26 wherein: said electromagnetic radiation is optical radiation.

30. A method in accordance with claim 29 wherein: said optical radiation is in the form of a pencil beam.

31. A method in accordance with claim 26 wherein: said inhibiting step inhibits detection of said first portion of electromagnetic radiation by controlling said projecting.

32. A method in accordance with claim 31 wherein: said controlling of said projecting is such that said projecting is stopped when any one of said second signals exceeds said predetermined level.

33. A method in accordance with claim 26 wherein: said detecting of said first portion of electromagnetic radiation includes developing first signals indicative of a plurality of different parts of said first portion of electromagnetic energy.

34. A method in accordance with claim 33 wherein: said first and second signals are each indicative of the energy in their corresponding parts of the respective first and second portions of electromagnetic radiation.

35. A method in accordance with claim 34 wherein: said detecting of said first portion of electromagnetic radiation comprises conveying said first portion of electromagnetic radiation to a first detector means having a plurality of elements each for developing independent of the other a signal indicative of the energy in a different one of the plurality of different parts of said first portion of electromagnetic radiation;
  and said detecting of said second portion of electromagnetic radiation comprises: conveying said second portion of electromagnetic radiation to a second detector having a plurality of elements each for developing independently of the other a signal indicative of the intensity of a different one of said different parts of said second portion of electromagnetic radiation; integrating each of said intensity signals to develop said second signals; and comparing the greatest of said second signals with said predetermined level.

36. A method in accordance with claim 35 wherein: said signals from said first detector elements are voltages signals;
  and said signals from said second detector elements are current signals.

37. A method in accordance with claim 35 wherein: said collecting step includes directing said reflected electromagnetic radiation to said first detector with a lens;
  and said detecting of said second portion of electromagnetic radiation further comprises splitting said electromagnetic radiation directed by said lens into said first and second portions of electromagnetic radiation and allowing said first portion of electromagnetic radiation to pass to said first detector and directing said second portion of said electromagnetic radiation to said second detector.

38. A method in accordance with claim 37 wherein: said lens focuses said electromagnetic radiation such that said first and second portions of electromagnetic radiation are focused on said first and second detectors, respectively.

39. A method in accordance with claim 35 wherein: the number of elements in said first detector is greater than the number of elements in said second detector.

40. A method in accordance with claim 39 wherein: the number of elements in said second detector is 8 and the number of elements in said first detector is 256.

41. A method in accordance with claim 26 further comprising:
  determining the average value of said second signals.

42. A method in accordance with claim 41 further comprising:
  determining the smallest of said second signals.

43. A method in accordance with claim 42 wherein: said projecting step is dependent on said average and smallest values of said second signals.

44. A method for use in developing data for determining the three dimensional position of the points on the surface of an object comprising:
projecting electromagnetic radiation over a given period of time at a point on the surface of an object;
collecting the electromagnetic radiation reflected from the object surface point for sensing the collected electromagnetic radiation;
and controlling said projecting to cause the energy of said projected electromagnetic radiation to be of a lower energy at the beginning of said period of time and to increase to a higher energy at the end of said period of time.

* * * * *

UNITED STATES PATENT AND TRADEMARK OFFICE
CERTIFICATE OF CORRECTION

PATENT NO. : 4,991,968
DATED : February 12, 1991
INVENTOR(S) : William E. Yonescu, et al.

It is certified that error appears in the above-indentified patent and that said Letters Patent is hereby corrected as shown below:

Col. 2, line 46.  Delete "and"

Col. 2, line 48.  Change "." to -- ; and --

Col. 2, line 48.  Insert -- FIG. 3 shows various waveforms developed by the sensor of the system of FIG. 1. --

Signed and Sealed this

Fourth Day of January, 1994

*Attest:*

BRUCE LEHMAN

*Attesting Officer*     *Commissioner of Patents and Trademarks*